US009227284B2

(12) United States Patent
Itou (10) Patent No.: US 9,227,284 B2
(45) Date of Patent: Jan. 5, 2016

(54) ROTARY TABLE DEVICE

(71) Applicant: FANUC Corporation, Yamanashi (JP)

(72) Inventor: Tomoya Itou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/266,710

(22) Filed: Apr. 30, 2014

(65) Prior Publication Data
US 2014/0326107 A1 Nov. 6, 2014

(30) Foreign Application Priority Data
May 1, 2013 (JP) .................................. 2013-096238

(51) Int. Cl.
*B23Q 16/00* (2006.01)
*B08B 5/00* (2006.01)
*B23Q 3/18* (2006.01)
*B23Q 1/52* (2006.01)
*B23Q 11/08* (2006.01)

(52) U.S. Cl.
CPC *B23Q 3/18* (2013.01); *B23Q 1/522* (2013.01); *B23Q 11/0883* (2013.01); *B23Q 2220/004* (2013.01); *Y10T 74/1488* (2015.01)

(58) Field of Classification Search
CPC .. B23Q 11/00; B23Q 11/005; B23Q 11/0075; B23Q 11/0883; B23Q 2220/004; Y10T 74/1488
USPC ........ 74/813 C, 813 R; 15/316.1, 318.1, 319, 15/405; 222/630
See application file for complete search history.

(56) References Cited

U.S. PATENT DOCUMENTS 5,305,592 A * 4/1994 Schulz et al. .................... 57/304
7,584,521 B2 * 9/2009 Lobb et al. .................... 15/316.1

FOREIGN PATENT DOCUMENTS

| JP | 10-37853 | A | 2/1998 |
| JP | H11267939 | A | 10/1999 |
| JP | 2001-128922 | A | 5/2001 |
| JP | 2004-357859 | A | 12/2004 |

OTHER PUBLICATIONS

Decision to Grant a Patent mailed Jan. 13, 2015, corresponding to Japanese patent application No. 2013-096238.

* cited by examiner

*Primary Examiner* — Thomas R. Hannon
*Assistant Examiner* — Adam D Rogers
(74) *Attorney, Agent, or Firm* — Lowe Hauptman & Ham, LLP (57) ABSTRACT

The inside of a case of a rotary table device is divided into a first space and a second space. The pressure of the first space is regulated to a pressure higher than the pressure of the second space during a steady state. The relationship between the pressures is reversed at a certain timing, to make the pressure of the second space higher than the pressure of the first space. Such operation can forcibly close a check valve disposed between the first space and the second space on regular basis, thereby preventing a malfunction of the check valve.

6 Claims, 6 Drawing Sheets

ROTARY TABLE DEVICE

RELATED APPLICATIONS

The present application claims priority to Japanese Application Number 2013-096238, filed May 1, 2013, the disclosure of which is hereby incorporated by reference herein in its entirety.

BACKGROUND OF THE INVENTION

1. Field of the Invention

The present invention relates to a rotary table device capable of preventing a malfunction of a check valve used therein and preventing penetration of cutting fluid and the like from the outside to the inside of a case.

2. Description of the Related Art

Figure 8:
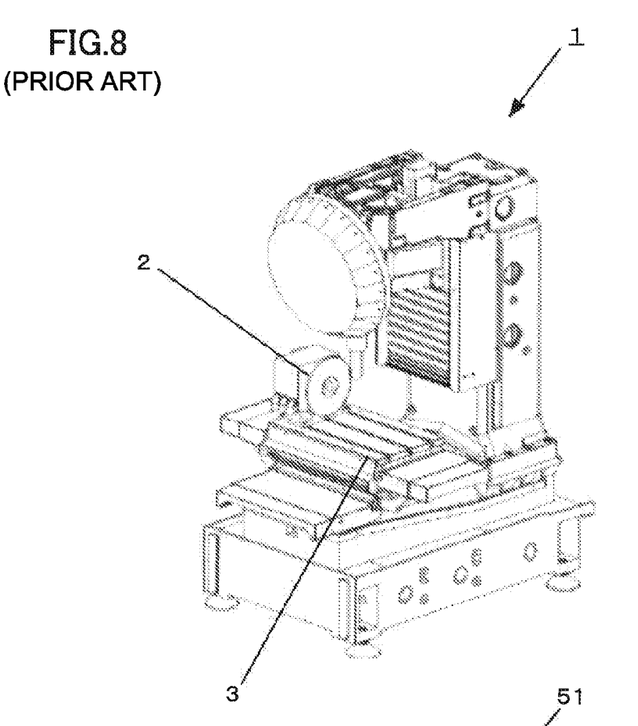
FIG. 8 is a general view of a machine tool that includes a conventional rotary table device.

There has been conventionally used a rotary table device shown in FIG. 8, which executes NC control to rotate or divide a workpiece installed on a machining table 3 of a machine tool 1 performing cutting, grinding, electrical discharge machining and the like. This type of device has a rotary table 2 provided with a case equipped with a servomotor, an operation validation switch, an electromagnetic valve, and other electric components, wherein cutting work, grinding work, electric discharge machining and the like are executed on a workpiece attached to the rotary table 2 while spraying/dipping the workpiece with/in cutting fluid, grinding fluid, dielectric working fluid and the like.

Cutting fluid, grinding fluid, and dielectric working fluid may be oil-based or water-soluble. Especially water-soluble fluid is usually sprayed in large amount when cutting a workpiece, in order to remove chips of the workpiece. Moreover, water-soluble cutting fluid, grinding fluid, and dielectric machining fluid are not only higher in permeability than the oil-based ones, but also likely to cause swelling and hardening of the synthetic resin materials used for covering seal packing and cables, deteriorating the resin materials.

Therefore, in the case where a synthetic resin material is used as a sealing member in the rotary table 2 of the machine tool 1, the synthetic resin could deteriorate as time passes, and causes the cutting fluid and the like to penetrate into the case in spite of the airtightness of the case in the beginning. Consequently, the moisture stick to and causes rust on the electric components such as the servomotor, the operation validation switch, and the electromagnetic valve equipped in the case, impairing the insulation properties of the electric components and eventually causing electrical hazards.

Figure 9:
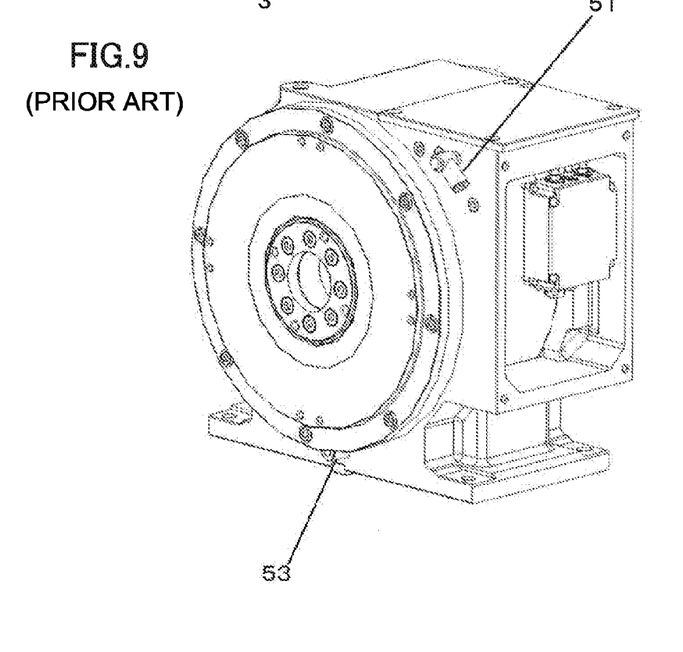
FIG. 9 is a general view of the conventional rotary table device.
Figure 10:
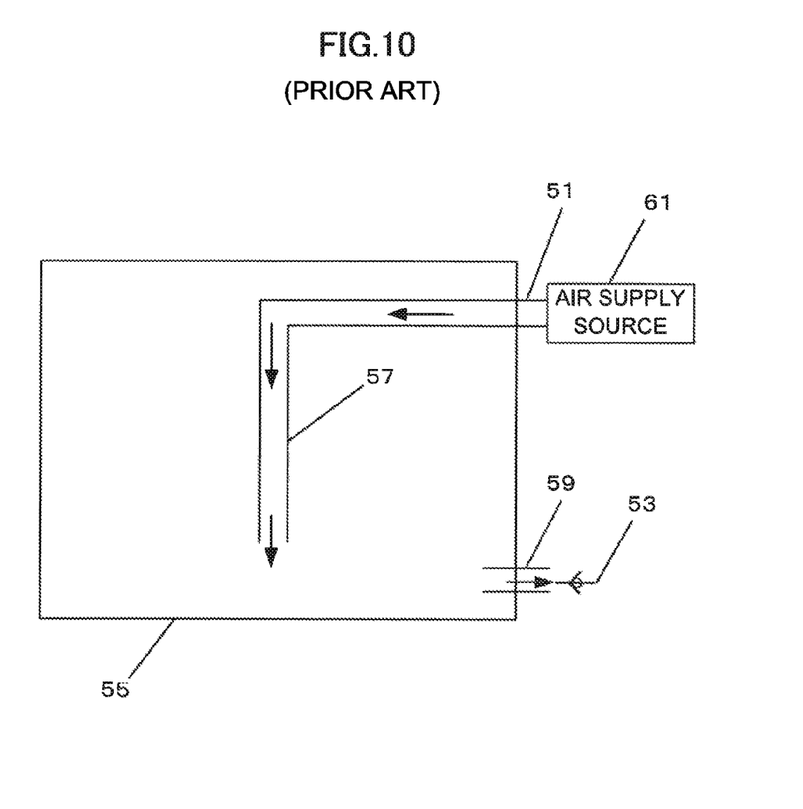
FIG. 10 is a schematic diagram of the conventional rotary table device.

Japanese Patent Application Laid-Open No. 11-267939 discloses a rotary table device as the means to solve these problems, in which is provided a check valve that is configured to discharge air only in one direction from the inside of a case of a rotary table to the atmosphere by supplying air into the case and discharging air to the outside of the case when the pressure within the case becomes equal to or greater than a predetermined pressure which is higher than an atmospheric pressure, in order to keep the pressure within the case higher than the atmospheric pressure so that cutting fluid and the like does not penetrate into the case. FIGS. 9 and 10 are each a general view of this rotary table device. Air is supplied from an air supply source 61 connected to an air supply port 51 into a case 55 through an air supply path 57, and the air within the case 55 is discharged to the atmosphere through an air discharge path 59 and a check valve 53.

The technology disclosed in this Japanese Patent Application Laid-Open No. 11-267939 constantly keeps the pressure of the case 55 at a pressure higher than the atmospheric pressure. Such a configuration allows the air to constantly flow in one direction from the inside of the case 55 to the outside through the check valve 53. As a result of this air flow in one direction, the check valve 53 assumes a state in which the valve thereof is opened for the long time, whereby the O-ring and the like on the check valve 53 becomes fixedly attached to a sliding portion, making it difficult for the check valve 53 to return even when the pressure inside the case 55 drops.

When the air inside the case 55 is leaked to the outside or when the air is no longer supplied to the case 55 due to deterioration of a sealing member of the case on account of the cutting fluid and the like, the pressure inside the case 55 cannot be kept at a pressure higher than the atmospheric pressure, causing penetration of the cutting fluid and the like from the check valve 53 into the case.

SUMMARY OF THE INVENTION

An object of the present invention, therefore, is to provide a rotary table device capable of preventing a malfunction of a check valve used therein and preventing penetration of cutting fluid and the like from the outside to the inside of a case.

The rotary table device according to the present invention has a case, a motor stored in the case, a table fixed to one end of an output shaft of the motor, a discharge port discharging air from the inside of the case to the outside, and a pressure regulating unit. The case are provided with first and second spaces partitioned with a partitioning member, a first air supply path supplying air to the first space, a second air supply path supplying air to the second space, and a check valve provided in the partitioning member. The discharge port discharges the air from the second space to the outside of the case. The pressure regulating unit is configured to constantly regulate a pressure of the first space and a pressure of the second space to a pressure higher than an outside pressure, and regulate the pressure of the first space to a pressure higher than the pressure of the second space during a steady state, but regulate the pressure of the second space to a pressure higher than the pressure of the first space at a certain timing.

The rotary table device may further have a single air supply source for supplying air to the first space and the second space, wherein the first air supply path may be provided with a regulating valve for lowering the pressure of the first space with respect to an air supply pressure of the air supply source.

The rotary table device may further have a single air supply source for supplying air to the first space and the second space, wherein the first air supply path may be provided with a first regulating valve for lowering the pressure of the first space with respect to an air supply pressure of the air supply source, and the second air supply path may be provided with a second regulating valve for lowering the pressure of the second space with respect to the air supply pressure of the air supply source.

The rotary table device may further have a first air supply source for supplying air to the first space and a second air supply source for supplying air to the second space, wherein the pressure regulating unit may be configured to control the pressure of the first space and the pressure of the second space.

The rotary table device may further have a clamping mechanism that is operated by supply of air to clamp the table, wherein air may be supplied to the clamping mechanism through the second air supply path. Moreover, the second air supply path may be provided with an electromagnetic valve which supplies air to the clamping mechanism, so as to regulate the pressure of the first space and the pressure of the second space.

The present invention can provide a rotary table device capable of preventing a malfunction of a check valve used therein and preventing penetration of cutting fluid and the like from the outside to the inside of a case.

BRIEF DESCRIPTION OF THE DRAWINGS

The foregoing and other objects and features of the present invention will become apparent from the following description of the embodiments with reference to the accompanying drawings.

DESCRIPTION OF THE PREFERRED EMBODIMENTS

First of all, the first embodiment of the rotary table device according to the present invention is described with reference to FIGS. 1 to 3.

Figure 1:
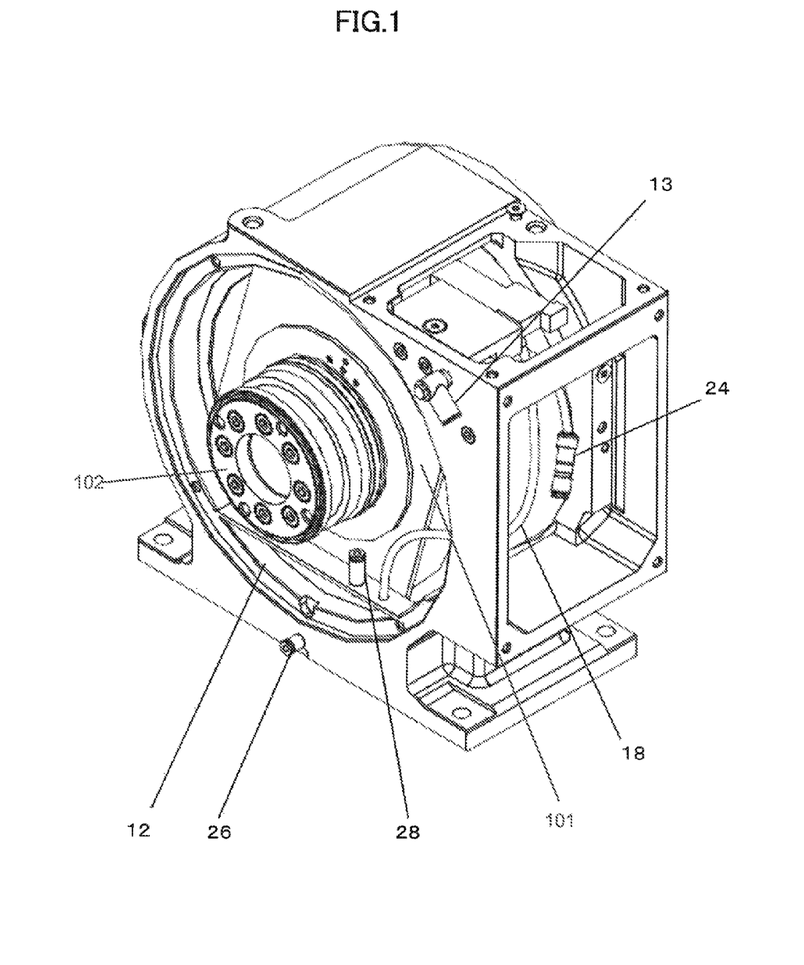
FIG. 1 is a general view of a first embodiment of a rotary table device according to the present invention.

FIG. 1 shows a general view of the embodiment. A motor 101 that comprises an output shaft 102 is located inside a case 10.

Figure 2:
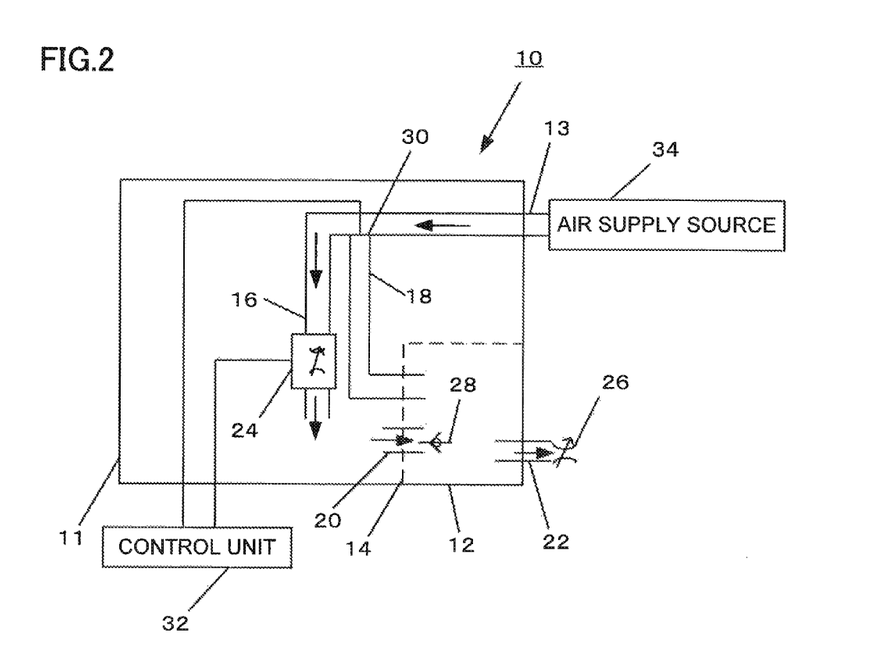
FIG. 2 is a schematic diagram for explaining a flow of air from an air supply source obtained during a steady state of the rotary table device shown in FIG. 1.

As shown in FIG. 2, the inside of a case 10 is divided into a first room 11 and a second room 12 by a partitioning member 14. The partitioning member 14 is provided with an inter-room air supply path 20. The inter-room air supply path 20 is provided with a check valve 28.

An air supply source 34 is connected to an air supply port 13 of the case 10 so that air is supplied from the air supply source 34 into the case through the air supply port 13. The air supplied through the air supply port 13 is then supplied to a first air supply path 16 and then to the first room 11 through a first regulating valve 24. An air branch point 30 is provided in the middle of the first air supply path 16, in which a second air supply path 18 branches off from the air branch point 30.

As will be described below, the air branch point 30 is configured to be able to open/close a flow path extending to the second air supply path 18. When the flow path extending to the second air supply path 18 is opened, the air supplied to the first air supply path 16 is supplied to the second room 12 as well through the second air supply path 18.

The air inside the second room 12 can be discharged to the outside through an air discharge path 22. This air discharge path 22 is provided with a discharge regulating valve 26 for regulating discharge of the air to the outside. The outside of the case 10 is provided with control unit 32. This control unit 32 not only regulates the first regulating valve 24 but also controls opening/closing of the flow path extending to the second air supply path 18 at the air branch point 30.

The operations of the rotary table device according to the present embodiment are described next.

FIG. 2 is a diagram for explaining a flow of air from the air supply source obtained during a steady state of the rotary table device.

Air is supplied from the air supply source 34 through the air supply port 13 and the first air supply path 16. The first regulating valve 24 lowers the pressure of the air supplied from the air supply source 34, to regulate the pressure inside the first room 11 to an appropriate level higher than the atmospheric pressure.

In this normal state, the control unit 32 closes the flow path extending from the first air supply path 16 to the second air supply path 18 at the air branch point 30; thus, the air from the air supply source 34 is not supplied to the second air supply path 18. When the pressure within the first room 11 reaches a predetermined pressure, the air is supplied to the second room 12 through the check valve 28 and the inter-room air supply path 20 provided in the partitioning member 14 between the first room 11 and the second room 12. The second room 12 is provided with the air discharge path 22 for discharging the air to the outside and the discharge regulating valve 26, so that the air supplied to the second room 12 can be discharged to the outside through the air discharge path 22 and the discharge regulating valve 26. Specifically, the relationship among the pressures is as follows.

Pressure of the first room>pressure of the second room>pressure outside the case 10 (atmospheric pressure)

Figure 3:
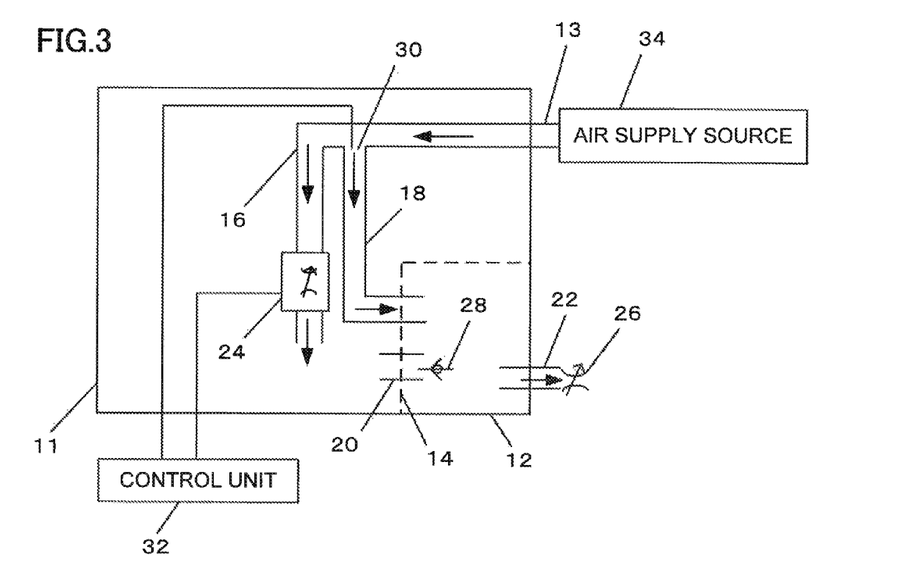
FIG. 3 is a schematic diagram for explaining a flow of air from the air supply source obtained during a state in which a check valve of the rotary table device shown in FIG. 1 is forcibly closed.

FIG. 3 shows a state in which the check valve 28 is forcibly closed, with the relationship between the pressure of the first room 11 and the pressure of the second room 12 reversed.

The relationship between the pressure of the first room 11 and the pressure of the second room 12 is reversed every certain time period from the state shown in FIG. 2 to the state shown in FIG. 3. More specifically, the control unit 32 is caused to open the flow path extending from the first air supply path 16 to the second air supply path 18 to supply the air from the air supply source 34 to the second air supply path 18. This makes the pressure of the second room 12 higher than that of the first room 11 while keeping the pressure of the first room 11 and the pressure of the second room 12 at a pressure higher than the atmospheric pressure. In other words, the following relationship is obtained.

Pressure of the second room>pressure of the first room>pressure outside the case 10 (atmospheric pressure)

Normally, because the pressure of the first room 11 becomes higher than the pressure of the second room 12 by establishing the pressure relationship shown in FIG. 2, the air can be constantly supplied from the first room 11 to the second room 12 via the check valve 28, preventing penetration of cutting fluid and the like from the outside into the case 10. In this case, the check valve 28 can forcibly be closed by establishing the relationship between the pressure of the first room 11 and the pressure of the second room 12 shown in FIG. 3 every certain time period. Such a configuration can prevent the O-ring of the check valve 28 from fixedly attached to the sliding surface, resolving the causes of a malfunction of the check valve 28.

In the present embodiment in which the flow path extending from the first air supply path 16 to the second air supply path 18 at the air branch point 30 is opened or closed, this flow path does not always have to be closed completely, and, therefore, the pressure within the second room 12 can be regulated by narrowing the flow path or using other methods. In addition, the relationship between the pressure inside the first room 11 and the pressure inside the second room 12 can be regulated simply by controlling the first regulating valve 24 without regulating the flow path extending from the first air supply path 16 to the second air supply path 18 at the air branch point 30.

Figure 4:
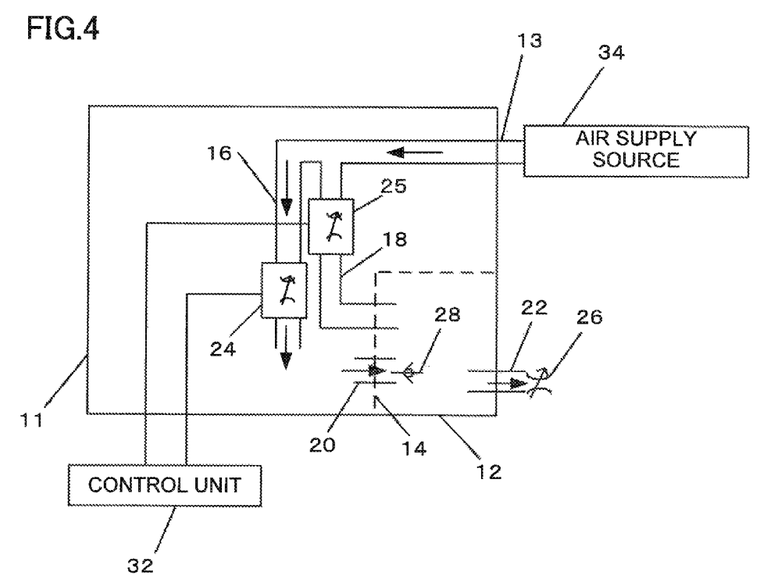
FIG. 4 is a schematic diagram for explaining a flow of air from the air supply source obtained during a steady state of a second embodiment of the rotary table device according to the present invention.

Next, the second embodiment of the rotary table device according to the present invention is described with reference to FIG. 4.

The difference between the second embodiment and the first embodiment is that the second air supply path 18 is provided with a second regulating valve 25. As with the first regulating valve 24, the second regulating valve 25 functions to lower the pressure of the air supplied from the air supply source 34 and is capable of changing the rate of pressure decline by means of the control unit 32 connected to the first regulating valve 24 and the second regulating valve 25.

In this embodiment as well, regulation by the control unit 32 can normally make the pressure of the first room 11 higher than the pressure of the second room 12, and reverse the relationship between the pressure of the first room 11 and the pressure of the second room 12 every certain time period, to make the pressure of the second room 12 higher than the pressure of the first room 11. Such a configuration can not only prevent penetration of the cutting fluid and the like into the case 10, but also reverse the relationship between the pressures every certain time period to forcibly close the check valve 28.

Figure 5:
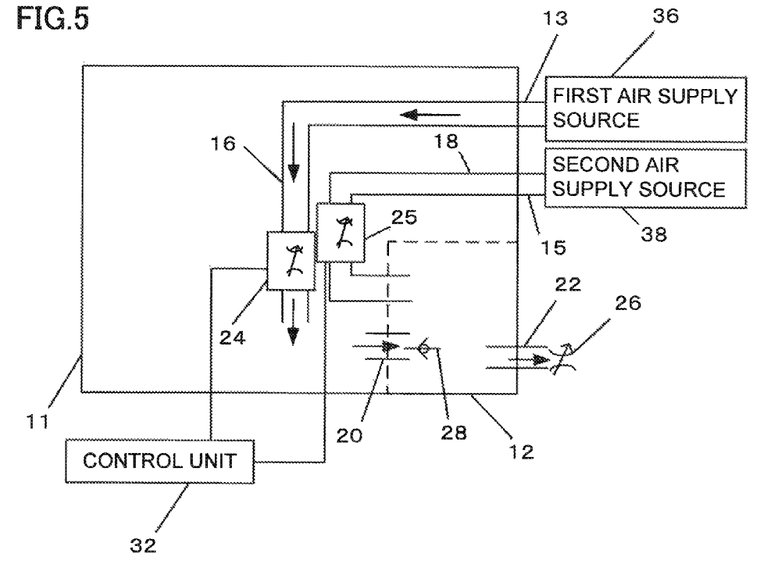
FIG. 5 is a schematic diagram for explaining a flow of air from the air supply source obtained during a steady state of a third embodiment of the rotary table device according to the present invention.

The third embodiment of the rotary table device according to the present invention is described next with reference to FIG. 5.

The differences between the third embodiment and the second embodiment are that an air supply source (first air supply source 36) is connected to the air supply port 13 connected to the first air supply path 16, and that an air supply source (second air supply source 38) is connected to an air supply port (second air supply port 15) connected to the second air supply path 18.

The pressure within the first room 11 and the pressure within the second room 12 are regulated by means of the first regulating valve 24 and the second regulating valve 25 as with the second embodiment but can also be regulated by regulating the outputs of the first air supply source 36 and the second air supply source 38, or the regulation can be also implemented by regulating both the first and second regulating valves as well as outputs of the air supply sources simultaneously.

Figure 6:
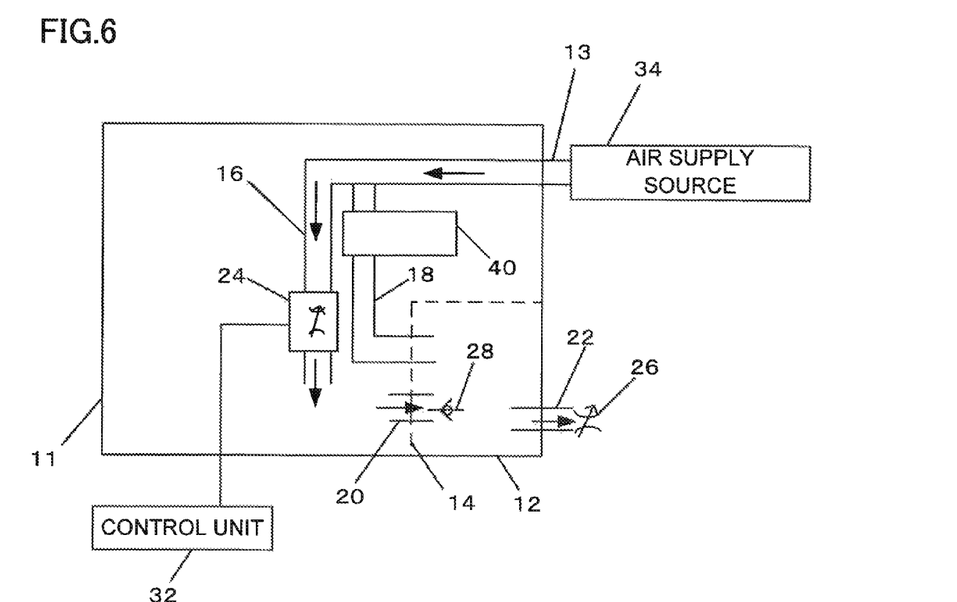
FIG. 6 is a schematic diagram for explaining a flow of air from the air supply source obtained during a steady state of a fourth embodiment of the rotary table device according to the present invention.

The fourth embodiment of the rotary table device according to the present invention is described next with reference to FIG. 6.

The difference between the fourth embodiment and the first embodiment is that the second air supply path 18 is provided with a rotary table clamping mechanism 40. In this embodiment, air is drawn when clamping the rotary table and is discharged when unclamping the rotary table. In so doing, the air to be discharged at the time of unclamping is used to supply air into the second room 12 to regulate the relationship between the pressure of the first room 11 and the pressure of the second room 12, and the check valve 28 is forcibly operated when the pressure within the second room 12 becomes higher than the pressure within the first room 11.

Figure 7:
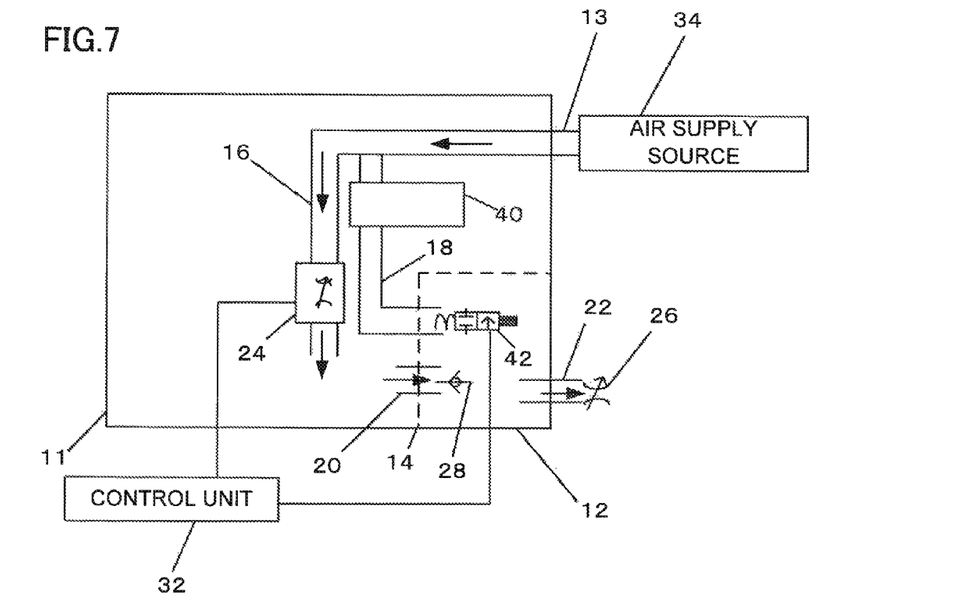
FIG. 7 is a schematic diagram for explaining a flow of air from the air supply source obtained during a steady state of a fifth embodiment of the rotary table device according to the present invention.

The fifth embodiment of the rotary table device according to the present invention is described next with reference to FIG. 7.

The difference between the fifth embodiment and the fourth embodiment is that a discharge port of the second air supply path 18 (inside the second room 12) is provided with an electromagnetic valve 42. In this embodiment, operating the electromagnetic valve 42 can switch between the clamping state and the unclamping state of the clamping mechanism 40.

In this embodiment as well, by switching between the clamping state and the unclamping state of the clamping mechanism 40 by the operation of the electromagnetic valve 42, the air to be discharged at the time of unclamping can be used to supply air into the second room 12, to regulate the relationship between the pressure of the first room 11 and the pressure of the second room 12, and the check valve 28 is forcibly operated when the pressure within the second room 12 becomes higher than the pressure within the first room 11, as with the fourth embodiment.

In the fourth embodiment, the relationship between the pressure of the first room 11 and the pressure of the second room 12 is regulated by switching between the clamping state and the unclamping state of the clamping mechanism 40 by the operation of the electromagnetic valve 42. However, only the electromagnetic valve 42 may be provided without the clamping mechanism 40, and supply of air into the second room 12 can be controlled by operating the electromagnetic valve 42, to regulate the relationship between the pressure of the first room 11 and the pressure of the second room 12.

The first to fifth embodiments described above use a regular check valve as the check valve 28, but a relief pressure valve may be used instead.

What is claimed is:

1. A rotary table device, comprising:
a case;
a motor stored in the case;
a table fixed to one end of an output shaft of the motor;
a discharge port discharging air from the inside of the case to the outside; and
a pressure regulating unit, wherein
the case has:
first and second spaces partitioned with a partitioning member;
a first air supply path supplying air to the first space;
a second air supply path supplying air to the second space; and
a check valve provided in the partitioning member, and wherein
the discharge port discharges the air from the second space to the outside of the case, and
the pressure regulating unit constantly regulates a pressure of the first space and a pressure of the second space to a pressure higher than an outside pressure, and regulates the pressure of the first space to a pressure higher than the pressure of the second space during a steady state, but regulates the pressure of the second space to a pressure higher than the pressure of the first space at a certain timing.

2. The rotary table device according to claim 1, further comprising a single air supply source for supplying the air to the first space and the second space,
   wherein the first air supply path is provided with a regulating valve for lowering the pressure of the first space with respect to an air supply pressure of the air supply source.

3. The rotary table device according to claim 1, further comprising a single air supply source for supplying the air to the first space and the second space,
   wherein the first air supply path is provided with a first regulating valve for lowering the pressure of the first space with respect to an air supply pressure of the air supply source, and the second air supply path is provided with a second regulating valve for lowering the pressure of the second space with respect to the air supply pressure of the air supply source.

4. The rotary table device according to claim 1, further comprising:
   a first air supply source for supplying the air to the first space; and
   a second air supply source for supplying the air to the second space,
   wherein the pressure regulating unit controls the pressure of the first space and the pressure of the second space.

5. The rotary table device according to claim 1, further comprising a clamping mechanism that is operated by a supply of air to clamp the table,
   wherein the air is supplied to the clamping mechanism through the second air supply path.

6. The rotary table device according to claim 5, wherein the second air supply path is provided with an electromagnetic valve, and
   the air is supplied to the clamping mechanism by the electromagnetic valve so as to regulate the pressure of the first space and the pressure of the second space.

* * * * *